Aug. 14, 1956 W. E. SAXE 2,758,445
DEVICE FOR COOLING AND DEWATERING SAND AND AGGREGATE
Filed Nov. 30, 1951
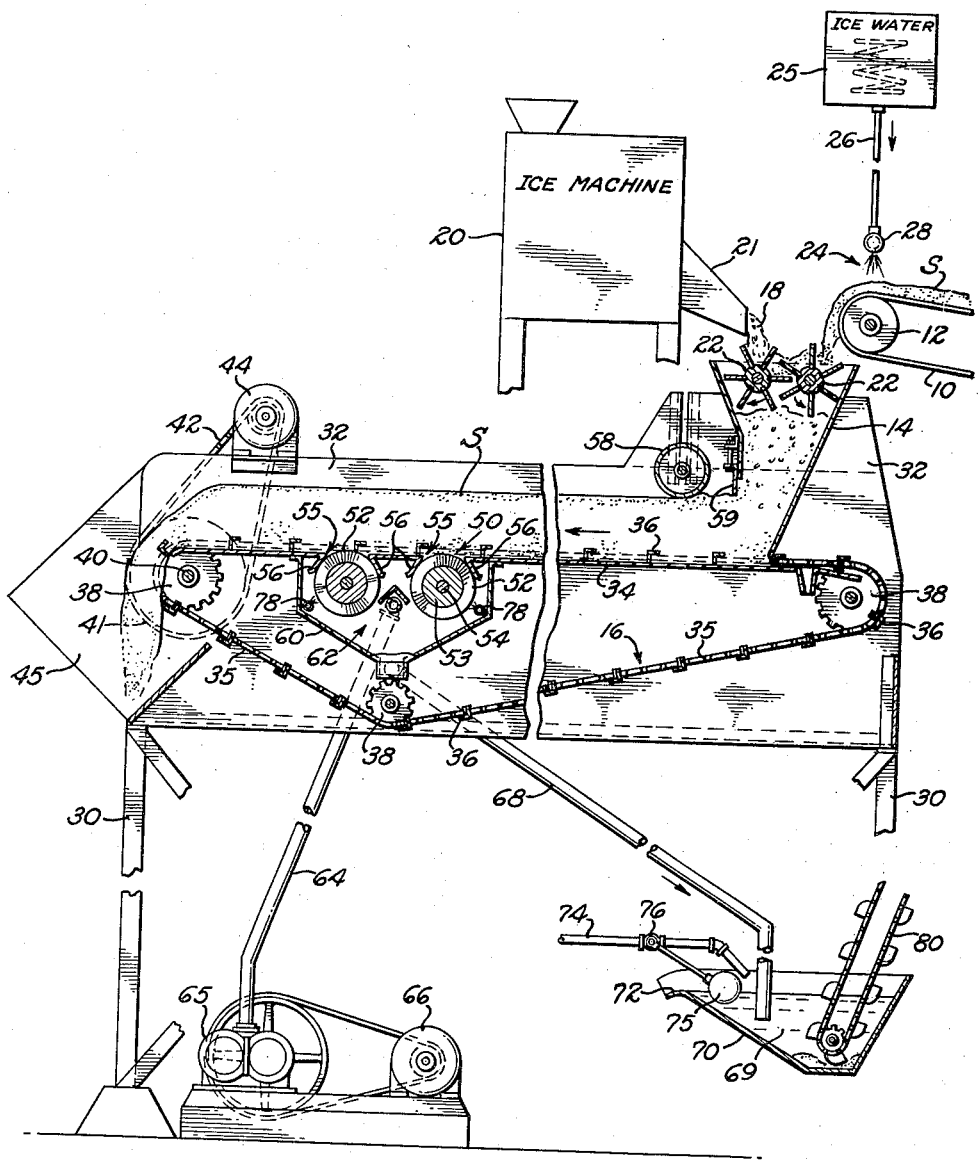
INVENTOR:
WALTER E. SAXE
BY HIS ATTORNEYS
HARRIS, KIECH, FOSTER & HARRIS
By

United States Patent Office 2,758,445
Patented Aug. 14, 1956

2,758,445
DEVICE FOR COOLING AND DEWATERING SAND AND AGGREGATE

Walter E. Saxe, Pasadena, Calif., assignor to The Conveyor Company, Inc., a corporation of California Application November 30, 1951, Serial No. 259,150

7 Claims. (Cl. 62—1)

This invention relates to methods and means for conditioning sand and other aggregate employed on large construction projects.

In keeping with the progress in modern, large scale construction, it has become desirable to prepare sand or similar aggregate which has been washed and cooled. One cooling scheme which has been used for coarse aggregate has employed cold air which is passed through the aggregate accumulated in bins. Sand cooling with refrigerated screw conveyors has also been attempted. Cooling is so slow and cooling times required for such procedures so long that the amounts of aggregate in process run into very high and excessive tonnages. Also apparatus of the conveyor type is unduly expensive, both as to initial cost and as to maintenance.

I have discovered that aggregate may be washed and properly cooled with incident dewatering, in substantially the same time that has heretofore been required only to wash and dewater the aggregate, and it is a principal object of this invention to wash, adequately cool, and dewater aggregate without significant increase in the time factor over that heretofore employed merely for washing and dewatering.

It is also an object of the invention to effect such a required cooling with only very simple additions to that equipment which is used for washing and dewatering.

It is another object of the invention to provide a method in which an appropriate chilling agent is introduced concurrently with some one or more of the steps otherwise required in handling the aggregate, such as by the addition to the aggregate, for example following washing, of ice water, or ice flakes, or other chilling agent which may be readily and intimately commingled with the sand or similar aggregate during some one of the usual steps of advancing the aggregate in conjunction with the washing and dewatering procedure.

Still another object of the invention is to provide for the intimate mixing of an appropriate chilling agent during an advancing step whereby to avoid any intervening cessation of the movement of the aggregate being prepared. As an example, appropriate chilling may be effected by sprinkling ice water upon a layer of aggregate as it is being transferred from a washer to a dewatering device, or by dropping chipped water ice or "dry ice" (frozen carbon dioxide) or the like into the moving aggregate as it is passed to a dewatering device, for example where the aggregate and the chilling agent have tumbled into a hopper feeding the dewatering apparatus and wherein intimate commingling of the aggregate and the chilling agent is automatically effected. Another object of the invention is to provide an aggregate cooling process of such nature that, where cold liquid or liquefying chilling agent are used, such liquid may be removed, following the chilling, in conjunction with any other dewatering operation, whereby to avoid any additional liquid-removing step and also to avoid increasing the liquid content of the finished aggregate.

Other objects of the invention and its various features will become apparent upon reference to the following specification and the accompanying drawing wherein certain procedures are indicated and a form of apparatus is illustrated.

In the drawing, the figure shows one arrangement of efficient equipment for carrying on the novel method of this invention.

As illustrated, washed sand S which has been withdrawn from any appropriate washing apparatus, not shown, and which may have been dried more or less as desired, is advanced by an endless belt conveyor 10, moving on a plurality of rollers, one of which is shown at 12. The washed sand S discharged by the conveyor 10 drops into a hopper 14 of appropriate dewatering apparatus generally indicated at 15, and the sand is continuously removed from the bottom of the hopper 14 by means of an endless conveyor generally indicated at 16.

In one method for cooling the aggregate according to this invention, chipped or flaked ice 18 produced by an ice machine 20 is discharged therefrom, as by means of a chute 21, into the body of sand S passing to the hopper 14. With this arrangement, wherein the sand S and chipped ice 18 are tumbled into the hopper 14 simultaneously, good mixing of the sand and the ice is accomplished by the time that the treated sand is removed from the bottom of the hopper under the influence of the endless conveyor 16. If necessary to get optimum contact, because of the different specific heats of sand and ice, any appropriate mixer means may be used ahead of the hopper 14, such as typified by the rotary agitators 22 to which the belt 10 and the chute 18 feed and which might be in the form of a pug mill, for example.

Another means for cooling the body of sand S discharged by the endless conveyor 10 is to supply to the sand, for example as it leaves the conveyor 10, a spray 24 of ice water which is supplied, as from any appropriate apparatus 25 in which the water is appropriately chilled, by a supply pipe 26 leading to a spray head 28. This spray of ice water is easily distributed over the sand body leaving the conveyor 10 and is readily dispersed therethrough. If desired, both the chipped ice 18 and the chilled water 24 may be employed whereby to effect quick and thorough distribution of the total chilling medium.

The dewatering apparatus 15 may, for example, be that of my earlier Patent 2,237,635 of April 8, 1941. It comprises an appropriate framework including supporting legs 30 for side walls 32 whose rear end portions carry the hopper 14, and may in fact constitute the corresponding end walls of such hopper. The sand leaving the bottom of the hopper 14 is received by a platform 34 along which the previously mentioned endless conveyor 16 advances. The conveyor 16 may be composed of a pair of chains 35 between which extends a plurality of crossbars or flights 36 that may be in the form of angle irons which move along the platform 34 in the direction of the arrow to act as buckets and advance the sand S along such platform. The chains 35 of the endless conveyor 16 may be passed over sprocket wheels 38, of which there are three pairs in the form shown, one of these pairs being driven, as by an axle 40 thereof, a sprocket wheel 41 and a chain 42 from an electric motor or other power source 44. When the sand being advanced has been dewatered, as presently to be explained, it is discharged to any appropriate receptacle by way of a chute 45.

Dewatering is effected through the medium of cylindrical, rotating filter brushes 50, built up from closely packed bristles 52, appropriately carried upon cylindrical brush heads 53 mounted upon driven shafts 54, each brush 50 and its shaft 54 is horizontally disposed so that an elongated strip of bristles 52 at the top of the brush projects into a corresponding gap or slot 55 in the platform 34. Such a bristle structure has been found highly efficient as a sand filter, and the sand is adequately retained above the brush filters by employing arcuate flanges 56 at each side of each slot 55, these flanges, which may be integral with the platform 34, depending under the platform 34 and closely contacting the bristle ends and fitting the brush contour. The sand bed on the platform 34 may be compacted and conditioned for the best removal of water by employing, for example, a compacting roller 58 which follows a vertically adjustable gate 59 on the forward wall of the hopper 14.

In order to facilitate dewatering and make it possible to reduce the water content of the sand to any required commercial maximum, a box-like housing 60 is provided under the platform 34 to house the filter brushes 50 and to provide therewithin a vacuum chamber 62. A vacuum is produced in chamber 62 by any appropriate means, such as through a vacuum line 64 connected with a vacuum device such as a vacuum pump 65 or suitable fan structure capable of producing a vacuum, for example of about four inches of mercury, such vacuum-producing means being actuated through the medium of an electric motor 66 or the like.

By operating under a vacuum as indicated, the bristles 52 of the brushes 50 serve admirably for the passage into the chamber 62 of all water necessary to be withdrawn from the sand body S thereabove. Water removed from the sand when drawn into the vacuum chamber 62 is discharged from the bottom of the housing 60 through a line 68 whose lower end is maintained submerged in a body of water 69 carried in an underlying tank 70 from which excess water may overflow from a lip 72 and in which a submerging water level may be assured from a water supply line 74 controlled by a float 75 actuating a valve 76.

Since some fine sand characteristically is brought down into the chamber 62 in the bristles 52, clogging of the bristles thereby is avoided by dislodging such sand through the medium of jets of water sprayed against the bristles by adjacent elongated spray pipes 78. Such loosened sand, of course, passes down into the tank 70 through the line 68 and, as it accumulates in the bottom of the tank 70, it is removed, as by a bucket conveyor 80 for return to any appropriate place in the system.

The rotary brushes 50 are driven through the medium of their shafts 54 in any suitable manner, such as by sprockets on the outer ends thereof and drive chains leading to the motor 44 or the motor 66 or other power means.

From the foregoing it becomes apparent that sand S, or other aggregate, being advanced from any washing apparatus by the endless belt conveyor 10 and tumbled into the hopper 14 is adequately commingled with chipped ice 18, or with the sprayed ice water 24, or both (with or without the mixing water 22), and that by the time the sand has moved downward in the hopper 14 onto the platform 34 and has been advanced by the conveyor 16 to the rotary filter brushes 50, the sand will have been thoroughly cooled by the applied chilling agent, and any water-ice flakes will have melted or Dry Ice flakes will have dissipated. As a consequence, any water which has been added to the sand during the cooling operation will be easily removed simultaneously with that water which remained in the sand at the time that it was fed from the washing apparatus by the conveyor 10 to the hopper 14. In order to limit cooling to taking heat out of the sand, rather than out of wash water, as much as possible, the washed sand discharged by the belt 10 may have been previously dewatered to any economic extent required. Of course, the feed of cooling agent will be required to be regulated in accordance with the initial sand temperature and that at which the aggregate is required to be delivered to the job.

Each cooling operation may have been facilitated, if desired, by washing the sand initially in a very cold water bath, although such washing to effect a corresponding amount of cooling may have been much less economical than the specific cooling operations effected by the introduction of ice water 24 or frozen refrigerant 18. Cold water for this purpose may have been taken from the tank 70 receiving water taken from previously cooled sand.

Otherwise stated, an efficient and economical procedure is provided by this invention to effect the required cooling of aggregates commercially required nowadays on large construction operations, as heretofore indicated. It is intended to cover such variations of the specific procedures herein disclosed as fall within the spirit of the patent claims.

I claim as my invention:

1. A method for preparing a cooled aggregate which includes the steps of: withdrawing wet aggregate from a washing step; continuously dewatering such aggregate; continuously passing the washed aggregate from the washing step to the dewatering step; continuously discharging dewatered aggregate; and continuously supplying to the washed aggregate a cooling agent in quantity to lower the temperature of said aggregate to a required value, while commingling said agent with said aggregate and maintaining contact therebetween for a time to effect the required cooling, said cooling agent being a cold solidified normally fluid material, and being supplied between the washing and dewatering steps.

2. A method as in claim 1 wherein said cooling agent is ice.

3. Apparatus for dewatering and cooling aggregate including: a dewatering device having means for passing washed aggregate through said device and means to remove water; means for conducting washed aggregate to said device; and means for supplying a chilling medium to said aggregate as it is passed to said device for intimate mingling with said aggregate, said supplying means including apparatus for producing and feeding finely divided ice.

4. Apparatus as in claim 3 wherein said device includes a hopper to which aggregate from said conducting means is fed and wherein said supplying means is disposed to supply said chilling agent to said aggregate in its passage to said hopper.

5. Apparatus as in claim 3 wherein said supplying means is located ahead of said water-removing means whereby liquid from the chilling medium is removed by said water-removing means along with wash water in the washed aggregate.

6. Apparatus as in claim 5 wherein said supplying means is a machine for feeding flaked ice.

7. Apparatus for dewatering and cooling aggregate including: means for continuously supplying washed, wet aggregate; means for continuously receiving said washed aggregate from said supplying means; means for continuously feeding into said receiving means a finely divided solidified chilling medium capable of chilling the aggregate; conveying means for continuously receiving the chilled aggregate; and means for continuously dewatering said washed aggregate on said conveying means.

References Cited in the file of this patent

UNITED STATES PATENTS

| | | |
|---|---|---|
| 1,139,484 | Bryan | May 18, 1915 |
| 2,237,635 | Saxe | Apr. 8, 1941 |
| 2,309,036 | Beardsley | Jan. 19, 1943 |
| 2,491,194 | McShea | Dec. 13, 1949 |
| 2,585,739 | Christian | Feb. 12, 1952 |
| 2,595,631 | Bertsch | May 6, 1952 |
| 2,648,206 | Carr | Aug. 11, 1953 |